(12) United States Patent
Wollner

(10) Patent No.: US 6,413,626 B1
(45) Date of Patent: Jul. 2, 2002

(54) WHEEL WEIGHT/TAPE ARTICLE AND A METHOD OF USING

(75) Inventor: Mark R. Wollner, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/581,059

(22) PCT Filed: Feb. 15, 1993

(86) PCT No.: PCT/EP93/00358

§ 371 (c)(1),
(2), (4) Date: Jun. 8, 2000

(87) PCT Pub. No.: WO93/17315

PCT Pub. Date: Sep. 2, 1993

(51) Int. Cl.[7] .................................................. B32B 7/12
(52) U.S. Cl. .................. 428/317.3; 74/573 R; 301/5.21
(58) Field of Search ....................... 301/5.21; 74/573 R; 428/40.1, 40.9, 41.7, 41.8, 317.3

(56) References Cited

U.S. PATENT DOCUMENTS

| | | | |
|---|---|---|---|
| 2,292,024 A | * | 8/1942 | Dreher |
| 3,273,941 A | | 9/1966 | Skidmore |
| 3,960,409 A | * | 6/1976 | Songer ..................... 301/5.21 |
| 4,024,312 A | | 5/1977 | Korpman |
| 4,269,451 A | | 5/1981 | Narang |
| 4,300,803 A | | 11/1981 | Chorosevic |
| 4,379,596 A | | 4/1983 | Green et al. |
| 5,082,706 A | * | 1/1992 | Tangney ..................... 428/40.1 |
| 5,409,189 A | | 4/1995 | Lühmann |
| 5,458,401 A | * | 10/1995 | Baccman .................. 301/37.43 |
| 5,491,012 A | | 2/1996 | Lühmann et al. |
| 5,658,630 A | * | 8/1997 | Shizuruda et al. ......... 428/40.1 |
| 6,231,962 B1 | | 5/2001 | Bries et al. |
| 6,238,760 B1 | * | 5/2001 | Majumdar et al. ......... 428/40.1 |
| 6,260,929 B1 | * | 7/2001 | Oba et al. .................. 301/5.21 |

FOREIGN PATENT DOCUMENTS

| | | |
|---|---|---|
| DE | 33 31 016 | 7/1992 |
| DE | 90 13 697 U | 12/1993 |
| DE | 90 13 697 | 12/1997 |
| EP | 563272 | 2/1997 |
| FR | 2 687 747 A | 8/1993 |
| JP | 58 152612 A | 3/1982 |
| JP | 58-152612 | 9/1983 |
| WO | WO 93/17315 | 9/1993 |
| WO | WO 95/06691 | 3/1995 |
| WO | WO 97/07172 | 2/1997 |

* cited by examiner

Primary Examiner—Russell D. Stormer
(74) Attorney, Agent, or Firm—Scott R. Pribnow

(57) ABSTRACT

Easily removable, pressure-sensitive adhesive tape/wheel weight articles are provided. The articles of the invention comprise (a) a stretchable tape, wherein the tape has a first major surface and a second opposing major surface; and (b) a weight attached to the first major surface of the tape; wherein said tape is capable of being firmly bonded to a wheel via the second major surface of the tape and further being capable of being removed from the wheel and the weight after being stretched at an angle no greater than about 35 degrees from the surface of the wheel.

42 Claims, 6 Drawing Sheets

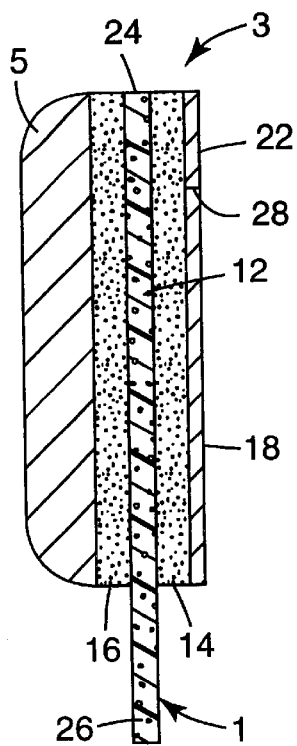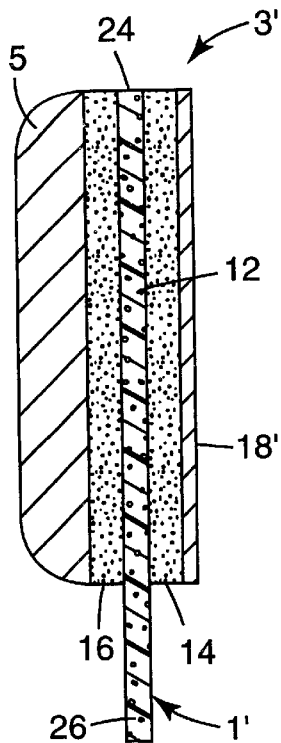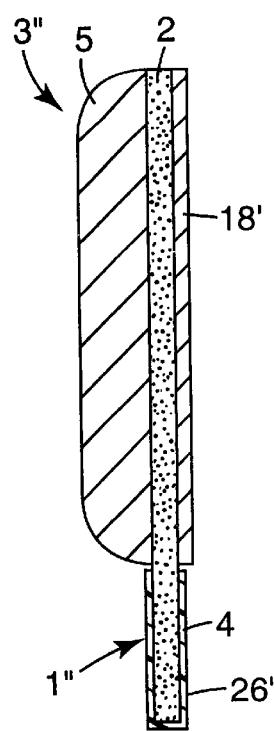
*Fig. 1a*  *Fig. 1b*  *Fig. 1c*
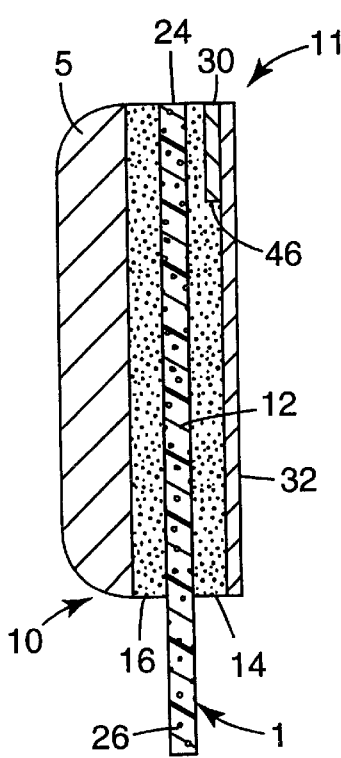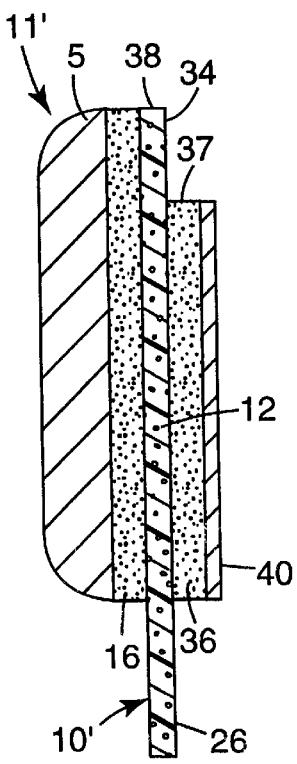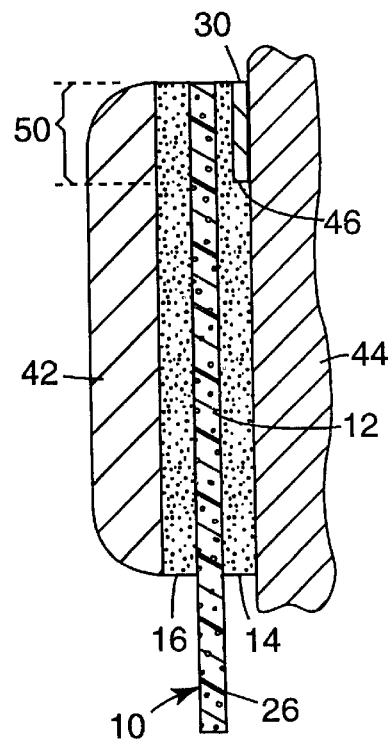
*Fig. 2*  *Fig. 3*  *Fig. 4*

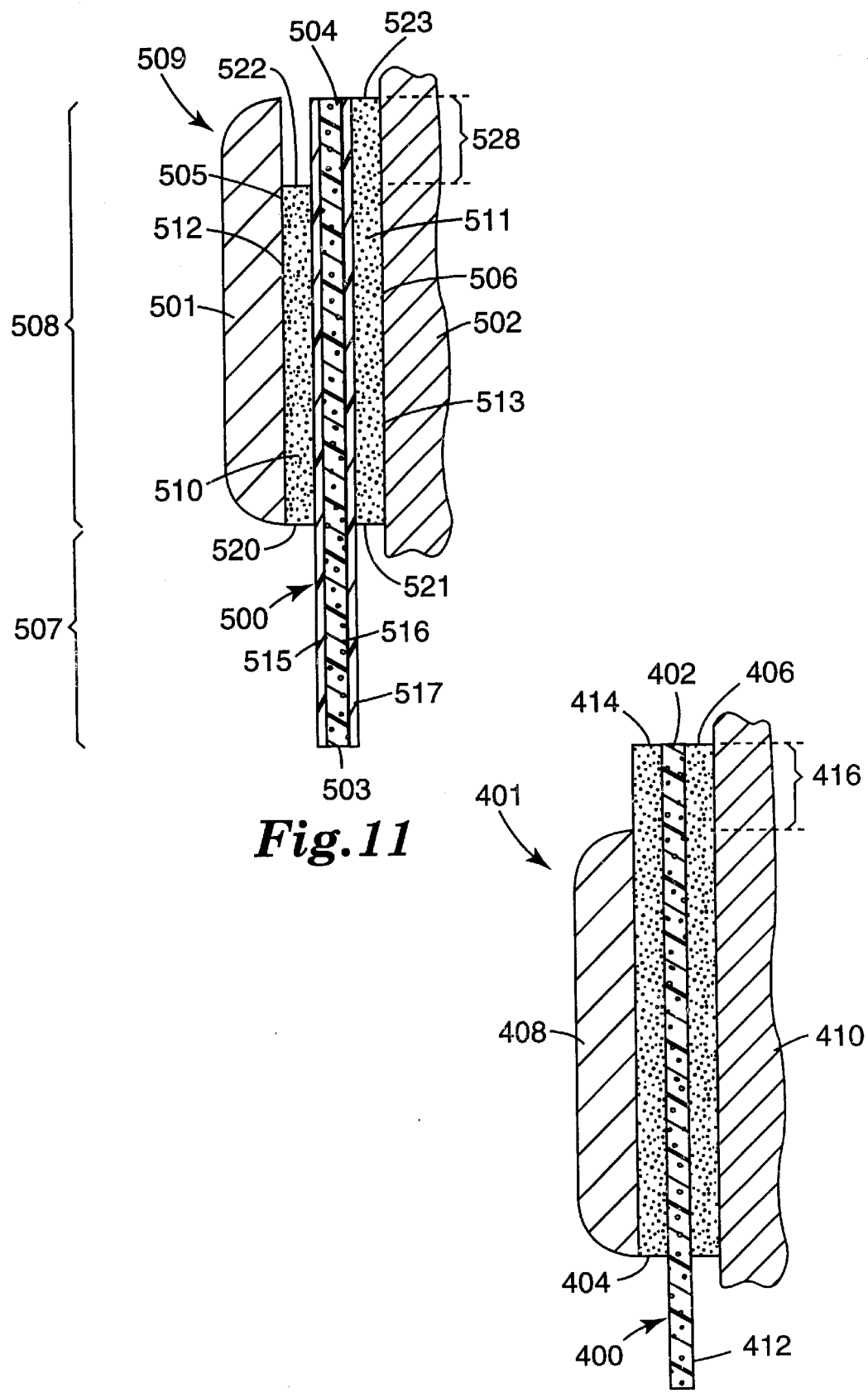

WHEEL WEIGHT/TAPE ARTICLE AND A METHOD OF USING

FIELD OF THE INVENTION

The present invention relates to novel articles that can be used to balance tires, which articles can be firmly attached to a wheel surface and later removed without damaging the wheel surface or leaving adhesive or other tape residue thereon.

BACKGROUND OF THE INVENTION

A number of wheel weight attachment systems have been proposed and used to improve the balance of a rotating wheel having a conventionally pneumatic tire mounted thereon. The wheel weight is typically attached to the rim flange. Such a circumferentially extending weight is selectively placed on the rim at a location generally corresponding to the radial location indicated by the tire balancer.

Disadvantages exist with respect to known attachment techniques, most of them associated with the prospect of removal when readjustments are later needed. The use of clip weights results in the contact of two dissimilar metals (that is the clip and the wheel). In severe winter and salt driving conditions the potential for corrosion exists. Clip weights can also potentially damage wheels by inflicting scratches thereon These scratches can become noticeable upon removal or relocation of the wheel weight.

The use of foam tape to attach wheel weights to a wheel is also disadvantageous in that the foam tape can split apart at the backing and leave adhesive and backing residue on the wheel surface upon removal. The residue is unsightly and can become even more unsightly as the residue picks up dust, dirt, etc. In addition, the wheel substrate can potentially be damaged by the process of removing these residues (via brushes, blades, solvents, for example).

JP 58152612 A uses an adhesive to attach a two part weight system wherein the one upper layer is a relatively high molecular weight rubber and the lower rubber layer is a low tensile strength material that facilitates removal of the weight balancing composite. These are recommended for aircraft wheels but also can apply to other transportation wheels.

WO 93/17315 and U.S. Pat. No. 4,269,451 suggest other methods of avoiding the problem of wheel weight removal.

WO 93/17315 discloses a device for attaching a balancing weight to the wheel of a vehicle. According to the reference, in order to create a device for mechanically attaching a balancing weight consisting of weight and a retaining spring to the wheel of a vehicle, the retaining spring being inserted between the tire and the rim flange and the device being provided with a detachable mounting system to accommodate the retaining spring, said system enabling mechanical mounting of a balancing weight on a vehicle weight, it is proposed that the device should comprise a shock or percussion unit mounted behind the detachable mounting system which when actuated pushes the balancing weight out of the mounting system.

U.S. Pat. No. 4,269,451 discloses a balancing system for a wheel having a tire mounted on the rim thereof which consists of at least one and as many as three balancing components including rim mounted weights, an annular member including a balancing medium positioned within the rim, and a shock absorber between the wheel and brake drum. The weights are relatively narrow in width and elongated in length and are mounted on the rim to extends predominantly radially of the tire sidewall rather than circumferentially. The annular member is suspended from the tire within the radially outer portion of the air cavity of the tire and during rotation of the tire automatically corrects for imbalance by circumferential migration of the balancing medium and/or annular member to the area of imbalance and/or by radial displacement of the annular member.

International Publication No. WO 00/06495, entitled "WHEEL WEIGHT ATTACHMENT SYSTEM" discloses a wheel weight attachment system which does not leave an adhesive residue or other tape residue upon removal. A wheel weight is attached to a wheel via a double-sided adhesive tape. The wheel weight is removed by prying lifting the wheel weight with a tool such as pliers. The tape remains adhered to the wheel weight as it debonds from the wheel.

SUMMARY OF THE INVENTION

The present invention provides an easily removable, pressure-sensitive adhesive tape/wheel weight article. The article of the invention comprises:

(a) a stretchable tape, wherein the tape has a first major surface and a second opposing major surface; and (b) a weight bonded to the first major surface of the tape, wherein said tape is capable of being firmly bonded to a wheel via the second major surface of the tape and further being capable of being removed from the wheel and the weight after being stretched at an angle no greater than about 35 degrees from the surface of the wheel, wherein a tab extends from the tape from at least one end, wherein said tab is capable of being gripped in a manner to stretch the tape at an angle no greater than 35° from the surface of the wheel, wherein the cohesive strength of the tape is greater than its adhesive strength to the wheel weight and the wheel.

The present invention provides an easily removable, pressure-sensitive adhesive tape/wheel weight/bracket article. The article of the invention comprises:

(a) a stretchable tape, wherein the tape has a first major surface and a second opposing major surface; and (b) a bracket bonded to the first major surface of the tape; and (c) a weight interlocked into the bracket, wherein the weight is not directly bonded to the tape;

wherein said tape is capable of being firmly bonded to a wheel via the second major surface of the tape and further being capable of being removed from the bracket after being stretched at an angle no greater than about 35 degrees from the surface of the wheel, wherein a tab extends from the tape from at least one end, wherein the weight extends over the tab, wherein the weight is capable of being subsequently removed from the bracket to expose the tab, wherein said tab is capable upon removal of the weight of being gripped in a manner to stretch the tape at an angle no greater than 35° from the surface of the wheel, wherein the cohesive strength of the tape is greater than its adhesive strength to the bracket and the wheel.

The present invention provides an easily removable, pressure-sensitive adhesive tape/bracket/wheel weight article. The article of the invention comprises:

(a) a stretchable tape, wherein the tape has a first major surface and a second opposing major surface; and (b) a bracket bonded to the first major surface of the tape; and
(c) a weight interlocked into the bracket, wherein the weight is not directly bonded to the tape; wherein
wherein said tape is capable of being firmly bonded to a wheel via the second major surface of the tape and further being capable of being removed from the bracket after being stretched at an angle no greater than about 35 degrees from the surface of the wheel, wherein a tab extends from the tape from at least one end, wherein the weight extends over the tab, wherein the weight is capable of being subsequently removed from the bracket to expose the tab, wherein said tab is capable upon removal of the weight of being gripped in a manner to stretch the tape at an angle no greater than 35° from the surface of the wheel,
wherein the cohesive strength of the tape is greater than its adhesive strength to the bracket and the wheel.

An example of a useful tape having a plastic backing is a tape comprising a highly extensible, substantially non-recoverable backing, bearing on at least a portion of both major surfaces thereof a layer of pressure-sensitive adhesive, said tape being capable of being firmly bonded to both a wheel weight (or bracket) and a wheel and being further capable of being removed therefrom after only being stretched at an angle no greater than about 35 degrees from the surface of the wheel.

When the tape comprises a backing with adhesive layers on either side the adhesive layers should be selected such that they do not separate from the backing when the backing is subjected to stretching. The adhesive layer(s) is also preferably highly extensible for tapes that comprise a single layer of adhesive and for tapes that comprise a backing with adhesive coated on either side.

The article of the invention can be firmly bonded to a wheel and can then be removed by simply stretching the tape in a direction up to an angle of about 35 degrees from the surface of the wheel, preferably up to about 30 degrees, more preferably up to about 10 degrees without leaving traces of adhesive residue, backing residue, or other tape residue on the wheel surface and without imparting any perceptible damage to the surface of the wheel.

Depending on the specific embodiment the adhesive of each layer of a tape having a backing and two adhesive layers can be of equivalent or different chemical composition, of equivalent or different adhesion properties, of equivalent or different thickness, and coated or laminated in the same or different manner.

The present invention also relates to a method of balancing a wheel utilizing the wheel weight/tape article of the invention. The method of the present invention comprises the steps of:
(a) providing an article comprising:
   (i) a stretchable tape, wherein the tape has a first major surface and a second opposing major surface; and
   (ii) a weight bonded to the first major surface of the tape;
      wherein said tape is capable of being firmly bonded to a wheel via the second major surface of the tape and further being capable of being removed from the wheel and the weight after being stretched at an angle no greater than about 35 degrees from the surface of the wheel, wherein a tab extends from the tape from at least one end, wherein said tab is capable of being gripped in a manner to stretch the tape at an angle no greater than 35° from the surface of the wheel,
      wherein the cohesive strength of the tape is greater than its adhesive strength to the wheel weight and the wheel; and
(b) applying the article to a wheel via the adhesive on the second major surface of the article.

The method may optionally further comprise the step (c) of subsequently removing the tape from the wheel and the weight by grasping the tab and stretching the tape at an angle no greater than about 35° from the surface of the wheel in order to remove the tape from the wheel and the weight, wherein no or substantially no pressure sensitive adhesive from the article remains on the wheel.

The present invention also relates to a method of balancing a wheel utilizing the wheel weight/bracket/weight article of the invention. The method of the present invention comprises the steps of:
(a) providing an article comprising
   (i) a stretchable tape, wherein the tape has a first major surface and a second opposing major surface; and
   (ii) a bracket bonded to the first major surface of the tape; and
   (iii) a weight interlocked into the bracket, wherein the weight is not directly bonded to the tape;
      wherein said tape is capable of being firmly bonded to a wheel via the second major surface of the tape and further being capable of being removed from the bracket after being stretched at an angle no greater than about 35 degrees from the surface of the wheel, wherein a tab extends from the tape from at least one end, wherein the weight extends over the tab, wherein the weight is capable of being subsequently removed from the bracket to expose the tab, wherein said tab is capable upon removal of the weight of being gripped in a manner to stretch the tape at an angle no greater than 35° from the surface of the wheel,
      wherein the cohesive strength of the tape is greater than its adhesive strength to the bracket and the wheel; and
(b) applying the article to a wheel via the adhesive on the second major surface of the article.

The above method optionally further comprises the step (c) of subsequently removing the tape from the wheel and the bracket by grasping the tab and stretching the tape at an angle no greater than about 35° from the surface of the wheel in order to remove the tape from the wheel and the bracket, wherein no or substantially no pressure sensitive adhesive from the article remains on the wheel.

The above method optionally further comprises the step (c) of subsequently removing the tape from the wheel and the bracket by grasping the tab and stretching the tape at an angle no greater than about 35° from the surface of the wheel in order to remove the tape from the wheel and the bracket, wherein no pressure sensitive adhesive from the article remains on the wheel.

The present invention also relates to a method of balancing a wheel utilizing the tape/weight/bracket article of the invention. The method of the present invention comprises the steps of:
(a) providing an article comprising
   (i) a stretchable tape, wherein the tape has a first major surface and a second opposing major surface; and
   (ii) a weight bonded to the first major surface of the tape; and
   (iii) a bracket interlocked into the weight, wherein the bracket is not directly bonded to the tape;
      wherein said tape is capable of being firmly bonded to a wheel via the second major surface of the tape and further being capable of being removed from the wheel and the weight after being stretched at an angle no greater than about 35 degrees from the surface of the wheel, wherein a tab extends from the tape from at least one end, wherein the bracket extends over the tab, wherein the bracket is capable of being subsequently removed from the weight to expose the tab, wherein said tab is capable upon removal of the bracket of being gripped in a manner to stretch the tape at an angle no greater than 35° from the surface of the wheel, wherein the cohesive strength of the tape is greater than its adhesive strength to the weight and the wheel; and (b) applying the article to a wheel via the adhesive on the second major surface of the article.

The above method optionally further comprises the step (c) of subsequently removing the tape from the wheel and the weight by grasping the tab and stretching the tape at an angle no greater than about 35° from the surface of the wheel in order to remove the tape from the wheel and the weight, wherein no or substantially no pressure sensitive adhesive from the article remains on the wheel.

The above method optionally further comprises the step (c) of subsequently removing the tape from the wheel and the weight by grasping the tab and stretching the tape at an angle no greater than 35° from the surface of the wheel in order to remove the tape from the wheel and the weight, wherein no pressure sensitive adhesive from the article remains on the wheel.

After being applied to a wheel, the adhesive tape becomes firmly bonded to the wheel, but can be easily removed without damaging the wheel surface by simply stretching it in the direction substantially parallel to the surface of the wheel.

The present invention is advantageous in that it provides an article capable of balancing wheels with no scratching (as a result of application and removal of the wheel weight(s)) and little or no, most typically no, adhesive residue upon removal.

The present invention is also advantageous in that it provides an article capable of balancing wheels with little or no, most typically no, adhesive residue left on the weight upon removal of the article from the wheel (when the weight is adhered to the tape). This allows for ready recycling of the weight, which is especially beneficial when the weight is a material such as lead. For example, one can readily form another wheel weight/tape article from the previously used weight and apply it to another wheel to be balanced. Conventional tapes, on the other hand, leave adhesive and tape residue on the weight which is problematic from a reuse standpoint.

The present invention is also advantageous in that it provides an article capable of balancing wheels little or no, most typically no, adhesive residue upon removal on the bracket, when the bracket is adhered to the tape.

BRIEF DESCRIPTION OF THE DRAWINGS

FIG. 1A is an enlarged side view in cross-section of a first embodiment of an adhesive tape/wheel weight article in accordance with the present invention;

FIG. 1B is an enlarged side view in cross-section of a second embodiment of an adhesive tape/wheel weight article in accordance with the present invention, FIG. 1C is an enlarged side view in cross-section of a third embodiment of an adhesive tape/wheel weight article in accordance with the present invention;

FIG. 2 is an enlarged side view in cross-section of an alternate wheel weight/tape article of FIG. 1A;

FIG. 3 is an enlarged side view in cross-section of yet another alternative wheel weight/tape article of FIG. 1;

FIG. 4 is an enlarged side view in cross-section of the adhesive tape/wheel weight article of FIG. 2 shown adhered to a wheel surface;

FIG. 11 is an enlarged side view in cross-section of another embodiment of an adhesive tape/wheel weight article in accordance with the present invention comprising a film/foam/film laminate;

FIG. 12 is an enlarged side view in cross-section of another embodiment of an adhesive tape/wheel weight article in accordance with the present invention showing an alternative mounting application;

DETAILED DESCRIPTION OF THE INVENTION

Figure 5:
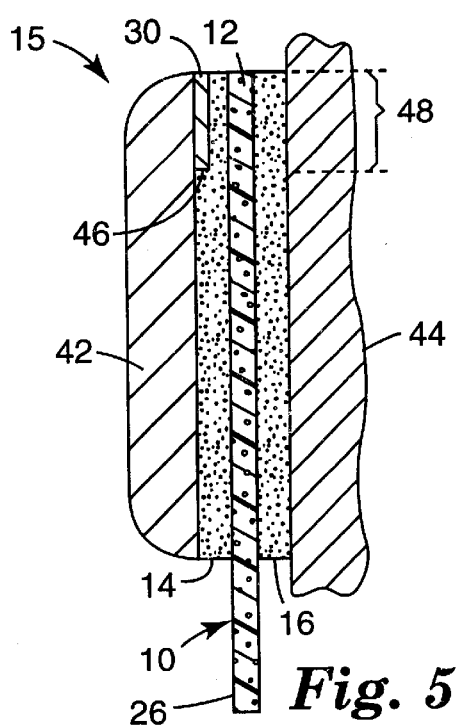
FIG. 5 is an enlarged side view in cross-section of the adhesive tape/wheel weight article of FIG. 2 shown adhered to a wheel surface as in FIG. 4, but with a release strip included in the tape construction positioned against the wheel weight rather than against the wheel surface.

Taps Used According to the Present Invention

The present invention utilizes a double-sided adhesive tape which is adhered to a wheel weight (or bracket wherein a wheel weight is interlocked into the bracket) and which can be adhered to a wheel surface and thereafter removed without damaging the wheel surface or leaving substantial adhesive residue. In a preferred embodiment the tape is a controlled sequential release of adhesive surfaces of a double-sided stretchable adhesive tape product. Some of these useful tapes are stretch double-sided adhesive tapes with an elastic backing, some are stretch double-sided adhesive tapes with a plastic backing, and others are double-sided adhesive tapes which comprise a single layer of adhesive.

Double-sided adhesive tape having conventional pressure-sensitive adhesive on both major surfaces thereof, and which includes a tape backing comprising a highly extensible material are disclosed in European Patent Application 92-903259.7 and U.S. Pat. No. 4,024,312 (assigned to Johnson & Johnson), both incorporated by reference herein. These tapes operate in that when the backing is stretched after the tape is adhered on one side or both sides, the adhesive stretches and undergoes clean interfacial debonding from the substrate or substrates to which it is adhered. Such removal typically progresses from one end of the tape to the other as the tape backing is stretched at an angle preferably no greater than about 35° from the surface of the substrate. That is, as the tape is stretched from one end, it debonds from the end being stretched toward its distal end.

The adhesive tapes described in the aforementioned European Patent Application 92.903259.7 include plastic backings. That means, as the backing is stretched, it is permanently deformed and has relatively low elastic recovery. Tapes described include double-sided tapes comprising film layers, foam layers, and laminates of films and/or foams. In these double-sided adhesive tape constructions, both adhesive surfaces debond at the same time and progress substantially at the same rate from the stretched end toward the distal end as the tape backing is stretched.

U.S. Pat. No. 6,231,962 and PCT publication WO 95/06691, both incorporated by reference herein, which are, both is commonly owned by the Assignee of the present invention, disclose a number of stretchable release tapes comprising constructions of films, foams, and laminates of films and/or foams. Again, such tapes include conventional pressure-sensitive adhesives.

Another type of stretchable release adhesive tape useful according to the present invention is described in U.S. Pat. No. 5,409,189 to Lühmann, incorporated by reference herein, wherein the adhesive tape backings utilized comprise elastic materials. Elastic, as opposed to plastic materials described above, means materials that are stretchable without substantial plastic deformation and which have high elastic recovery after stretching and release. Like the double-sided plastic tapes described above, double-sided elastic tapes can be stretched such that the stretching of the backing causes adhesive stretching and subsequent debonding of the adhesive surface or surfaces from the stretched end to the distal end as the tape is stretched.

An example of a double-sided adhesive tape with an elastic backing which may be useful according to the present invention is disclosed in U.S. Pat. No. 4,024,312 incorporated by reference herein. Representative examples of useful stretchable solid adhesive tapes are disclosed in U.S. Pat. No. 5,491,012 and DE 8310032.6, both incorporated by reference herein.

The stretchable release double-sided tapes used according to the invention can upon proper selection secure bonding to both the wheel weight (or bracket) and wheel with clean removal from both surfaces without substantial damage or adhesive residue. Some double-sided adhesive tapes simultaneously debond from both the wheel weight (or bracket) and wheel as the tape is stretched for removal. The release from both the wheel weight (or bracket) and the wheel surface at the same time may cause the adhesive tape to snap back in the direction of the stretching, similar to the snapping effect of a stretched rubber band, or may cause the wheel weight (or bracket) to be catapulted, particularly if the wheel weight is not held while being removed. This snapback of the tape occurs at the point of adhesive release when the resisting force of adhesion to the wheel suddenly drops to zero. This effect is exacerbated by the elasticity or recovery properties of the tape.

In order to help avoid such potential occurrences one may select a double-sided stretchable adhesive tape having the ability to control the timing of the debonding of both surfaces so that one adhesive surface releases before the other. That is a tape having controlled sequential release. Such controlled sequential release tapes are disclosed in PCT International Publication Number WO 97/07172, assigned to the assignee of the present invention and incorporated by reference herein.

The earlier release can be either on the wheel weight (or bracket) side or the wheel surface side, depending on the desired effect. Typically, however, the early release would be on the wheel weight (or bracket) side of the tape. Controlled sequential release is applicable to all stretchable tape constructions, including the use of plastic backing materials, elastic backing materials, and/or solid adhesive materials. The use of a sequential release tape allows such a wheel weight (or bracket) to be removed without risking substantial snap-back of the adhesive tape or catapulting of the wheel weight (or bracket). Sequential release tape constructions disclosed therein are those in which side-to-side debonding of the tape is sequential, i.e., one side of the tape completes debonding prior to the debonding of the opposite side of the tape.

As mentioned previously, the double-sided adhesive tape may comprise a stretchable solid adhesive, or has a stretchable backing layer, plastic or elastic. In a preferred embodiment using a sequential release tape, a lower-adhesion or non-adhesive portion of one adhesive surface is provided, so that a corresponding greater adhesion adhesive portion of the other side remains more aggressively adhered to a surface (typically the wheel surface) during stretch removal while the portion of the one adhesive surface is less aggressively adhered or completely released from its surface (typically the wheel weight or bracket surface). A non-adhesive portion may be adhesive-free, or may be an adhesive layer portion which is rendered non-adhesive. A lower-adhesion portion may comprise a low adhesion material, i.e., a weaker adhesive, or may be rendered lower in adhesion by a treatment or coating. In other embodiments, a release strip may be used to deaden the adhesive on the one side which is to be positioned adjacent the effective end of the object or the end of the surface to which the adhesive tape is to be applied. With the use of such a release strip, the one side completely debonds from its adhered surface (typically the wheel weight or bracket surface) prior to the complete debonding of the other side (typically the wheel surface). The non-adhesive portion of one adhesive surface can be rendered non-adhesive, as noted above, by providing such a release strip, or such portion may simply be adhesive-free. Alternatives useable for release strips include films, papers, powders, foams, inks, other coatings or treatments, and the like, which can be used to render an adhesive layer non-adhesive.

When the tape is a solid adhesive with no backing the tape can comprise a single layer of pressure sensitive adhesive providing both of the adhesively aggressive portions of the outer surfaces and including a masking layer of material having either no adhesive properties or adhesive properties that are significantly reduced from the layer of pressure sensitive adhesive. The masking layer can extend over a part of the layer of pressure sensitive adhesive defining one of the adhesively aggressive portions of the outer surfaces. That material in the masking layer can, for example, be release liner material, repositionable pressure sensitive adhesive, polymeric film, or low adhesion backsize material.

Preferably, the tape includes a stretchable polymeric backing layer having a layer of aggressive pressure sensitive adhesive along each of its opposite major surfaces defining one of its adhesively aggressive portions of its outer surfaces. That polymeric backing layer can, for example, be of polymeric film, polymeric foam, polymeric film laminated to polymeric foam, or two layers of polymeric film laminated on opposite sides of a layer of polymeric foam. For example, the backing may be a film/foam laminate, a film/foam/film laminate, or a foam/film/foam lamninate.

Commercially available double-sided adhesive tapes which are believed to be useful herein include the following: Poster strips with Command™ adhesive available from Minnesota Mining and Manufacturing Company and Tesa brand Power Strips™ available from Beirsdorf AG of Hamburg, Germany.

If the tape used according to the present invention did not firmly adhere the wheel weight (or bracket) to the wheel, the wheel weight (or bracket) would immediately fly off the wheel upon rotation of the wheel. The tape used according to the invention are selected such that this does not happen. Preferably the tapes are selected such that the wheel weight (or bracket) remains adhered to the wheel during use of the wheel until it is time to remove the wheel weight (or bracket).

Detailed Description of the Preferred Embodiments

With reference to the Figures, wherein like numerals are used to designate like components throughout, and initially to FIGS. 1–3, a first adhesive tape/wheel weight article will be described. In FIG. 1a the adhesive tape/wheel weight article is shown as 3. The adhesive tape construction 1 is particularly designed for stretching the entire tape 1 to effect debonding, as will be more fully described below. The tape 1 comprises a backing layer 12 and adhesive layers 14 and 16 of the same or different pressure-sensitive adhesive compositions on opposite major surfaces thereof Adhesive layer 16 is adhered to wheel weight 5. Adhesive layer 14 is preferably protected by liner 18 respectively, before the adhesive tape/wheel weight article is put into use. As illustrated, the backing layer 12 comprises a polymeric foam layer. The backing layer 12 can alternatively comprise a polymeric film layer. The choice of polymeric foam or polymeric film depends on the specific requirements for the tape 1. Polymeric foams can be chosen to optimize conformability and resiliency properties which are helpful when the tape 10 is to be adhered to a wheel weight (or bracket) or wheel having surface irregularities. Polymeric films may be used instead to increase load bearing strength and rupture strength of the tape; however, films are more suitable when the wheel weight (or bracket) and wheel are both very smooth. As an alternative, solid adhesives can be used instead of the combination of a film or foam with two adhesive layers. Known stretchable solid adhesives which are generally elastic in nature and usable include rubber-based and acrylate-based solid adhesives.

A feature of the preferred tape useful herein permits a controlled sequential release, described below, may be accomplished by the provision of a release strip 22, which is preferably positioned at a distal or second end 24 of the tape 1 away from a tab portion 26 adjacent an opposite first end of the tape 1. The tab 26 provides a means by which the backing layer 12 can be gripped by a user for effecting the stretch release of the tape 1.

The tab may be constructed by leaving one end of the backing 12 uncoated with adhesive as in FIG. 1a. Tab 26 can also be formed for example, by applying a non-adhesive material onto portions of the adhesive layer(s) to render them non-tacky. An adhesive-free tab 26 may optionally be formed by covering a portion of adhesive layers 14 and 16 to provide for grasping the tape for easy removal from substrates to which it will be subsequently adhered. The adhesive-free tabs can be made from polymeric materials or paper materials, preferably from the same materials as are useful for preparing the backings.

The purpose of the release strip 22 is to provide a non-adhesive zone of one of the adhesive layers 14 or 16 at the effective or functional end (distal or second end) 24 as shown in FIG. 1a of the tape 1. According to the FIG. 1a embodiment, the release strip 22 can comprise a portion of the liner 18 which is simply cut from the liner 18 as shown at 28. In other words, release strip 22 may comprise the same material as the liner 18. Also, the release strip 22 preferably covers the entire transverse width of the tape 1, the purpose of which is to provide a non-adhesive zone so that when the tape 1 is applied after liner 18 is removed, release strip 22 prevents the covered portion of adhesive 14 or 16 from adhering to any surface.

FIG. 1b is identical to FIG. 1a except that it is free of release strip 22 and the release liner 18' extends the length of the adhesive layer 14. Thus the wheel weight/tape article 3' does not employ a controlled sequential release tape as in FIG. 1a, but rather a tape that removes simultaneously from both the wheel weight 5 and wheel (not shown) surfaces. Adhesive layer 16 is adhered to wheel weight 5.

Alternatively, as shown in FIG. 2, a tape 10 of wheel weight/tape assembly 11 can comprise a release strip 30 separately provided to cover a portion of adhesive layer 14 or 16. Adhesive layer 16 is adhered to wheel weight 5. As shown, the release strip 30 covers a portion of adhesive layer 14 and is provided separately from a liner 32. The liner 32 is illustrated covering the release strip 30; however, the liner 32 need not necessarily cover release strip 30. The release strip 30 can comprise a silicone release paper which may be the same or different from the material of the liner 32, or may comprise any conventional material for rendering a portion of the adhesive 14 or 16 non-adhesive. It is conventionally known to use materials such as films, papers, powders, foams, inks, other coatings and treatments, and the like as a layer or coating over the relevant portion of the adhesive for rendering that portion of the adhesive non-adhesive. Films that adhere strongly to the adhesive layer 14 or 16 are preferred so as not to release during application, and include polyester materials such as polyethylene terephthalate (PET).

As an alternative to rendering a portion of an adhesive layer non-adhesive, as shown in tape 10' of wheel weight/tape article 11' of FIG. 3, a non-adhesive portion 34 can be provided by simply not coating the adhesive layer 36 all the way to the distal end 38 of the adhesive tape. As shown, a liner 40 may also preferably be provided which ends at the end of adhesive layer 36, although it may extend further to cover the non-adhesive portion 34. Adhesive layer 16 is adhered to wheel weight 5.

FIG. 1C is identical to FIG. 1B except that the tape 1" is not a backing with adhesive coated on either side but rather comprises a single layer of adhesive 2. The tape includes a tab 26'. The tab is formed by providing a non-tacky covering 4 over the portion of the adhesive layer 2 that extends beyond wheel weights. One side of solid adhesive layer 2 is attached to wheel weight 5, and the other side of adhesive layer 2 is attached to release liner 18'.

Mounting of a wheel weight to a wheel with the tape 10, of FIG. 2, in accordance with the present invention is shown in FIG. 4. Tape 10 is shown positioned between and adhered to a wheel weight 42, and a wheel surface, shown partially as 44. With reference to the tape construction of tape 10 shown in FIG. 2, adhesive layer 16 is adhered to the wheel weight 42 while adhesive layer 14 is adhered to the wheel surface 44. Adhesive layer 16 preferably corresponds with the surface of the wheel weight 42 to which it is adhered such that tab 26 extends from the wheel weight 42 to Facilitate stretch removal of the tape 10. Likewise, adhesive layer 14 is preferably similarly configured. In this application, the release strip 30 is positioned against a portion of the wheel surface 44 corresponding to an end portion of wheel weight 42 away from tab 26. As will be more fully understood with the description below, the mounting configuration of FIG. 4 will permit a sequential release of the double-sided adhesive tape structure 10 first from the wheel surface 44 and then from the wheel weight 42 during stretch release. The release strip 30 effectively prevents bonding in that area and therefore releases the tape 10 from the wheel surface 44 when the stretch release progresses up to the inner leading edge 46 of the release strip 30. The release of adhesive layer 16 progresses substantially evenly with the release of adhesive layer 14 so that a portion 50 of adhesive layer 16 is still adhered to the wheel weight 42 when the stretch release progresses to the inner leading edge 46 of release strip 30 at which instance the adhesive layer 14 is entirely released then from wheel surface 44.

FIG. 5 shows a wheel weight/tape article employing the same tape 10 of FIG. 2, in a similar application as in FIG. 4, but with the adhesive tape 10 reversed between wheel weight 42 and the wheel surface 44. Specifically, adhesive layer 14 is adhered to the back surface of wheel weight 42 and adhesive layer 16 is adhered to the wheel surface 44. Tab 26 extends from under the wheel weight 42 to facilitate stretch removal, and the release strip 30 is positioned against the effective end of the back surface of wheel weight 42 and at the end of tape 10 away from tab 26. More preferably, release strip 30 lies against the back surface of wheel weight 42 away from tab 26 completely to the edge of the back surface of wheel weight 42. Again, as will be detailed below, a progressive stretch release will cause adhesive layers 14 and 16 to simultaneously debond from the tab end 26 toward the release strip 30. In the FIG. 5 case, when the stretch release of adhesive layer 14 progresses to the inner leading edge 46 of the release strip 30, the adhesive layer 14 will be completely debonded from wheel weight 42. At the point where stretch release progresses to the inner leading edge 46 of release strip 30, a portion 48 of adhesive layer 16 will still be attached to the wheel surface 44.

Figure 6:
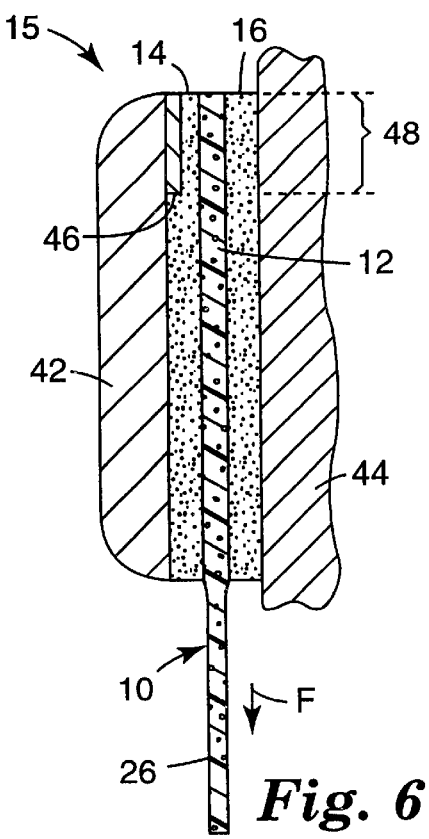
FIG. 6 is an enlarged side view in cross-section of the adhesive tape/wheel weight article and wheel as shown in FIG. 5, but with a backing layer in the tape construction partially stretched and just prior to any debonding of adhesive layers included in the tape construction.
Figure 7:
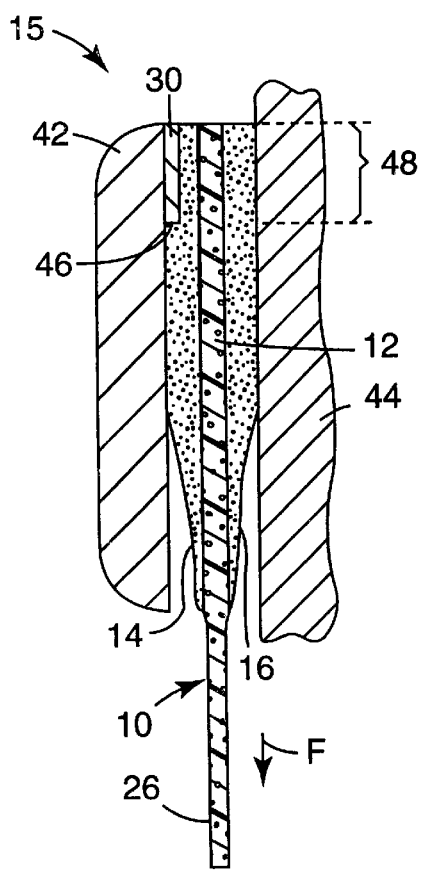
FIG. 7 is an enlarged side view in cross-section similar to FIG. 6, but with the backing layer further stretched and with both adhesive layers partially debonded from the wheel surface and wheel weight.
Figure 8:
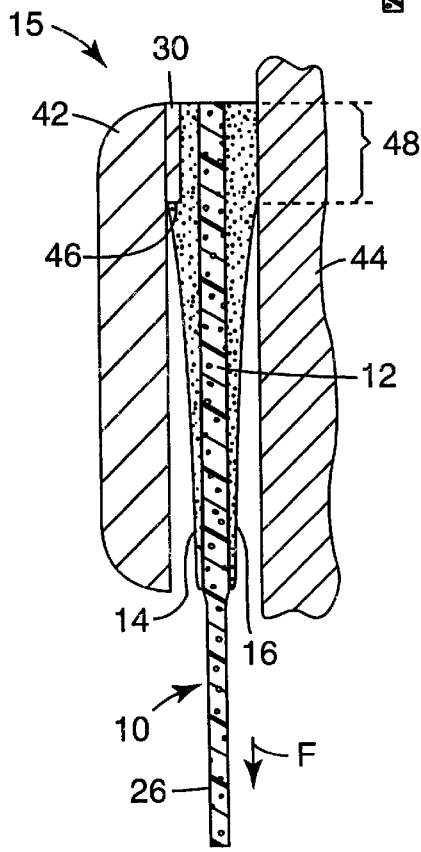
FIG. 8 is an enlarged side view in cross-section showing a further release step after that shown in FIG. 7, wherein the adhesive layer that was adhered to the wheel weight is entirely debonded while a corresponding portion of the adhesive layer adhering to the wheel surface is still adhered.

Such progressive stretch release and removal of an object such as wheel weight 42 from a wheel surface 44, is illustrated in FIGS. 6, 7, and 8. Starting with FIG. 6, after a force F is applied to tab 26, the backing layer 12 making up tab 26 is stretched. FIG. 6 shows the tape 10 with the tab 26 stretched but just before any debonding of adhesive layers 14 or 16. As continued force F is applied to the tab 26, and as shown in FIG. 7, a progressive debonding of adhesive layers 14 and 16 from the surfaces of wheel weight 42 and wheel surface 44 occurs. FIG. 7 shows such a progressive debonding at about the point of the half-way debonding of both adhesive layers 14 and 16. As can be seen, as the backing 12 is stretched, the adhesive layers 14 and 16 stretch and pull away from their respective surfaces and debond. FIG. 8 shows the point of progressive debonding where the debonding of adhesive layer 14 reaches the inner leading edge 46 of release strip 30. At this point, the release strip 30, together with the progressive adhesive, stretching up to inner leading edge 46, entirely releases the surface of wheel weight 42 from the tape 10. Meanwhile, a portion 48 of adhesive layer 16 is still adhered to the wheel surface 44.

In the situation just described, where release strip 30 is positioned to lie against the wheel weight, the stretch release of tape 10 permits the wheel weight 42 to simply fall or be easily removed from its mounted position on the wheel surface 44 while the tape 10 is still adhered to the wheel surface 44. This way, no additional force which otherwise might tend to catapult the wheel weight 42 is exerted onto the wheel weight 42 by the stretched tape 10 at the point of complete debonding of the wheel weight 42 from tape 10. After wheel weight 42 is released, continued stretching will simply cleanly release the remainder portion 48 of adhesive layer 16 from wheel surface 44. Alternatively, the remaining portion 48 could simply be peeled from the wheel surface 44.

In removing the wheel weight 42 from the surface of wheel surface 44 with the tape 10 applied in the manner shown in FIG. 4, one would hold onto the wheel weight 42 with one hand while the adhesive tape 10 is stretched to remove the wheel weight from the wheel surface. Stretching of the tape 10 eventually progresses to the point of the inner leading edge 46 of release strip 30 where complete debonding of the adhesive layer 14 from the surface of wheel surface 44 will occur resulting in the removal of the wheel weight 42. At this point, however, the area 50 of adhesive layer 16 of the tape 10 corresponding to the release strip 30 of adhesive layer 14 still remains adhered to the back of wheel weight 42. In this way, the risk of snap-back of the tape 10 is substantially eliminated, which is particularly problematic when the backing layer or solid adhesive layer is elastic. Once the wheel weight 42 is removed from the wheel surface 44, the remaining adhesive tape 10 can be stretched and cleanly removed from the wheel weight 42. Alternatively, the remaining portion 50 of tape 10 can be peeled from the wheel weight 42, although it is preferred to complete the stretch removal so that no adhesive residue is left on the surface of wheel weight 42 and the wheel weight 42 can be reused.

In either application shown in FIGS. 4 or 5, it can be seen that the release strip 30 provides the controlled early release of one of the adhesive layers relative to the other as caused by the simultaneous progressive debonding of both adhesive layers 14 and 16 from the tab end 26 up until the debonding reaches the inner leading edge 46 of the release strip 30. The length of the release strip 30 (the longitudinal dimension in the direction of the cross-section of the Figures) thus determines how early the first adhesive layer 14 releases before release of the second adhesive layer 16. Moreover, the area of release strip 30 substantially defines the size of the corresponding adhesive portions 48 and 50 which remain adhered after complete debonding of the first adhesive layer 14 during stretch release.

On the one hand, it is desirable to minimize the length of release strip 30 in order to ensure sufficient adhesive connection between the adhesive layer 14 of the tape 10 and either the wheel weight 42 or wheel surface 44; however, it is preferable that the length of release strip 30 be sufficient such that a total debonding of the one adhesive surface with release strip 30 occurs prior to any potential sheer failure of the adhesive making up the area of the remaining portion 48 or 50. This of course depends on the properties of the backing with respect to its Young's modulus and elongation characteristics and the specific pressure-sensitive adhesive making up the adhesive layer 16. With a low modulus material, the tape backing is more easily stretchable and less length of the release strip is required to provide the sequential debonding. With a higher modulus material, the tape backing is harder to stretch and a greater length of the release strip might be required. An additional advantage of the tape constructions described above is the reusability of the wheel weights.

Figure 9:
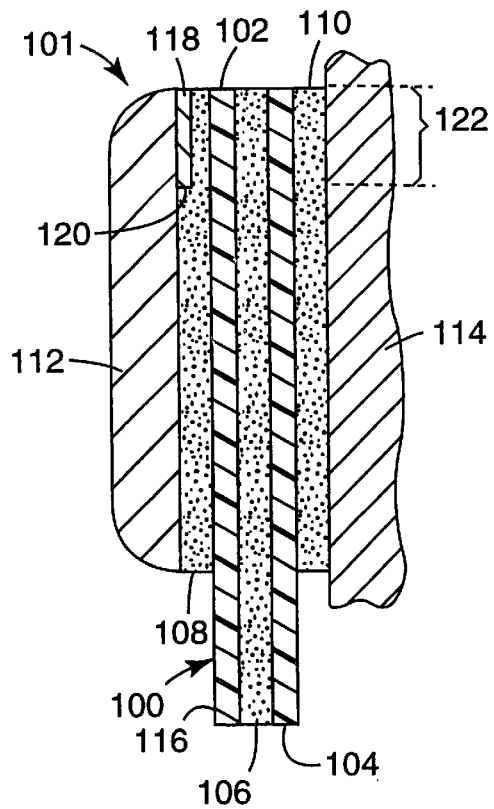
FIG. 9 is an enlarged side view in cross-section of another embodiment of an adhesive tape wheel weight article in accordance with the present invention comprising a film/foam laminate.

A second embodiment of a wheel weight/tape article 101 having sequential release tape 100 is illustrated in FIG. 9. Tape 100 comprises a polymeric foam layer 102 and a polymeric film layer 104 adhered to one another by a layer of pressure-sensitive adhesive 106. Alternatively, foam layer 102 and film layer 104 could be otherwise laminated by heat or by co-extrusion, or the like. Polymeric film layer 104 may be used to increase the load bearing strength and rupture strength of the tape 100, particularly where polymeric foam layer 102 lacks properties otherwise required in a backing to permit removal by stretching. Inclusion of the film layer 104 therefore permits greater latitude in the selection of foam layer 102 to optimize, for example, the conformability and resiliency properties. In a similar sense as the tape 10, described above, the entire tape laminate of the sequential release tape 100 is designed to be stretched for removal. The foam layer 102, film layer 104, and pressure-sensitive adhesive layer 106 constitute the backing of the tape 100. Foam layer 102 and film layer 104 also have adhesive layers 108 and 110, respectively, of the same or different pressure-sensitive adhesive compositions coated thereon for adhering tape 100 to wheel weight 112 and wheel surface 114. Again, this tape construction is particularly suited for stretching the entire tape to effect debonding from wheel weight 112 and wheel surface 114, which permits easy reusability of the wheel weight 112.

Alternatives to the employment of polymeric film layer 104 to provide the same increase in load bearing strength and rupture strength would be conventional reinforcement materials such as non-woven scrims, plastic meshes, or the like, which should also exhibit the relevant stretch characteristics needed for the above-described embodiment.

At one end of the foam layer 102 and film layer 104, a tab 116 is formed to facilitate the stretch removal of tape 100. Tab 116 is preferably made by simply not providing adhesive layers 108 and 110 at an end region of the backing. Otherwise, a coating, film, or the like, could be applied over adhesive layers 108 and 110, if extended over the entire backing, to form the tab 116. Opposite to the end of tape 100 where tab 116 is provided, a release strip 118 is also provided covering at least an effective end portion of adhesive layer 108 or 110. The effective or functional end of tape 100 opposite from the formation of tab 116 means the portion of adhesive layer 108 or 110 which is to be covered by release strip 118 in order to cause sequential release. That is, that one surface will completely debond before the other.

Sequential stretch release occurs with tape 100 substantially the same as that described above with regard to tape 10. Specifically, as tab 116 is grasped and a force applied to stretch the release tape 100, a progressive debonding of adhesive layers 108 and 110 occurs at substantially the same time. Again, the debonding occurs substantially simultaneously by stretching adhesive layers 108 and 110 as a result of the stretching of release tape 100. When the debonding of adhesive layer 108 reaches an inner edge 120 of release strip 118, adhesive layer 108 becomes entirely debonded from the surface to which it is applied, such as the back of a wheel weight 112 as shown in FIG. 9. At this point, an adhesive portion 122 substantially corresponding to the dimensions of release strip 118 will still remain adhered to the other surface to which the release tape 100 is applied, such as wheel surface 114 as shown in FIG. 9. Once the adhesive layer 108 is entirely debonded from its surface, the wheel weight 112 is removed from wheel surface 114. Thereafter, the remaining adhesive portion 122 can be removed by continued stretching or peeling of tape 100. Stretch removal is preferred since this will not leave adhesive residue on the remaining surface of adherence. Likewise with tape 10, described above, the release strip side of the tape can be applied to the wheel surface instead and would be removed in the same manner as described above with first release from the wheel 114.

Figure 10:
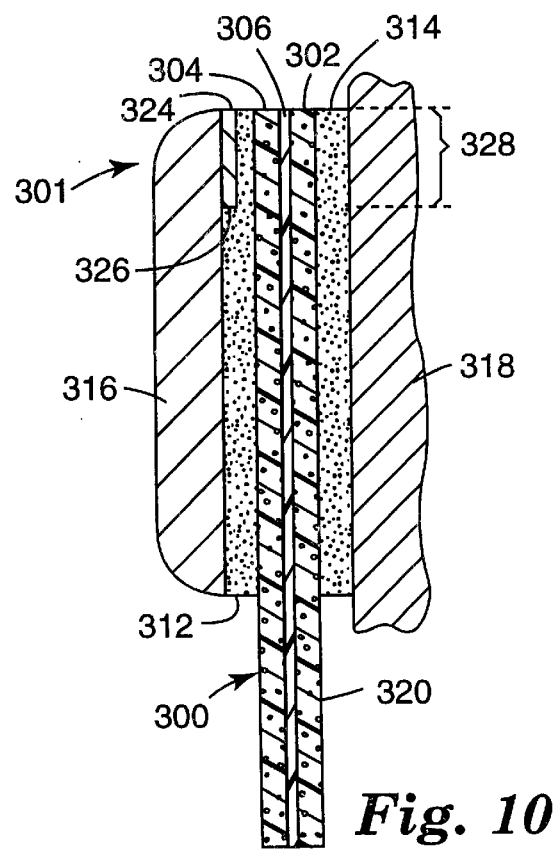
FIG. 10 is an enlarged side view in cross-section of another embodiment of an adhesive tape/wheel weight article in accordance with the present invention comprising a foam/film/foam laminate.

A fourth embodiment of another wheel weight/tape article 301 includes a sequential release tape 300 is illustrated in FIG. 10. Release tape 300 comprises a stretchable backing made up of a foam/film/foam laminate including polymeric foam layer 302, polymeric foam layer 304 and polymeric film layer 306. Film layer 306 can be conventionally laminated to, co-extruded with, or adhered to foam layers 302 and 304, similarly or differently from one another. Foam layers 302 and 304 bear on their major surfaces adhesive layers 314 and 312 of the same or different adhesive compositions for adhering the tape 300 to a wheel weight 316 and a wheel surface 318.

A tab 320 is provided comprising an extended portion of the foam/film/foam backing, preferably by not providing adhesive layers 312 and 314 on one end of tape construction 300. A release strip 324 is provided at the effective or functional end of release tape 300 away from tab 320. The release strip 324 provides the controlled early debonding of one of adhesive layers 312 and 314 prior to the other. Inner leading edge 326 of release strip 324 defines the point at which complete debonding of one adhesive layer occurs (adhesive layer 312, as illustrated) while a remaining portion 328 of adhesive remains (of adhesive layer 314, as illustrated) adhered to wheel surface 318). Tape construction 300 permits the foam layers, which can be the same or different, to be collectively or individually optimized for conformability and resiliency to their respective surfaces for adherence. As above, the film layer can be selected to enhance elongation, load bearing strength, and rupture strength.

A fifth embodiment of a wheel weight/tape article 509 using a sequential release tape 500 for attaching wheel weight 501 and a wheel surface 502 to each other is illustrated in FIG. 11. The release tape 500 has first and second opposite ends 503 and 504 spaced in a first direction, opposite first and second outer surfaces 505 and 506 extending between those ends 503 and 504, a manually engageable tab portion 507 adjacent its first end 503, and an attachment portion 508 between its tab portion 507 and its second end 504. The attachment portion 508 comprises two layers 510 and 511 of aggressive pressure sensitive adhesive of the same or different adhesive compositions providing an adhesively aggressive portion (512 and 513 respectively) of each of the outer surfaces 505 and 506. The layers 510 and 511 of adhesive are adhered along opposite major surfaces of a stretchable backing that is a film/foam/film laminate including a polymeric film layer 515, a polymeric foam layer 516 and a polymeric film layer 517. The film layers 515 and 517 can be conventionally laminated to, co-extruded with, or adhered to the opposite sides of the foam layer 516. Each adhesively aggressive surface portion 512 or 513 has a primary end (520 and 521 respectively) adjacent the first end 503 of the tape 500 and a secondary end (522 and 523 respectively) adjacent the second end 504 of the tape 500 and is adapted to be firmly adhered to a different one of the structures between its primary and secondary ends 520, 522; 521; 523.

The attachment portion 505 is stretchable so that when the attachment portion 508 is between and adhered to the wheel weight 501 and wheel surface 502 as illustrated in FIG. 11 it can be progressively stretched along its length by the manual application of force to the tab portion 507 to cause separation of the adhesively aggressive surface portions 512 and 13 from the structures progressively from their primary ends 520 and 521 towards their secondary ends 522 and 523. The secondary ends 522 and 523 of the adhesively aggressive surface portions 512 and 513 are spaced from each other in said first direction to cause essentially complete separation of the adhesively aggressive surface portion 512 from the wheel weight 501 prior to separation of the other adhesively aggressive surface portion 513 from the wheel surface 502. That spacing is caused in that the ends adjacent the tape's second end 504 of the layers 510 and 511 of aggressive adhesive on both major surfaces of the backing layer that define the secondary ends 522 and 523 of the adhesively aggressive surface portions 512 and 513 extend to different locations with respect to the second end 504 of the tape 500 to space the secondary ends 522 and 523 of the adhesively aggressive portions 512 and 513 of the outer surfaces 505 and 506 from each other.

The tape 500 thus provides controlled early debonding of the adhesive layer 510 prior to the adhesive layer 511. The secondary end 522 of the layer 510 of adhesive 510 defines the point at which complete debonding of the adhesive layer 510 occurs while a remaining portion 528 of the adhesive layer 511 remains adhered to the wheel surface 502. The foam layer 516 can be optimized for conformability and resiliency to facilitate adhesion of the adhesive layers 510 and 511 to surfaces such as those of the wheel weight 501 and the wheel surface 502. The film layers 515 and 517 can be selected to enhance elongation, load bearing strength, and rupture strength.

In view of the foregoing embodiments, it is evident that many modifications for other embodiments are possible combining various layers which are together optimized for a particular application. In general, foams are preferred to add resiliency and conformability, while films improve load bearing and rupture strength. For components of stretchable backing layers, the combined blacking must be sufficiently extensible for debonding to occur but of sufficient tensile strength so as not to rupture during debonding. It is also contemplated that more layers (films, foams, etc.) can be provided in any number of ways depending on the application.

As an alternative to each of the aforementioned embodiments expressly disclosed and/or suggested, it is also contemplated that the non-adhesive portion of one of the adhesive layers of a double-sided tape construction (whether: non-adhesive as in FIG. 3 or rendered non-adhesive by a release strip or the like) can instead comprise a low-adhesion portion. Such a construction provides a differential debonding and release. By low-adhesion, it is meant that there is a weaker or less aggressive adherence between the adhesive of that portion and the surface to which it adheres as compared to the adherence of the adjoining adhesive layer to its substrate. In one case, the release strip or non-adhesive portion of the above embodiments could be substituted with a composition of less aggressive adhesion material. Such low-adhesion material can be applied directly to the relevant backing layer or may be coated to the surface of the adjoining adhesive layer.

Any adhesive composition exhibiting a lower adhesion than the adjoining adhesive layer is contemplated, including the other compositions of the adhesive materials listed below. Moreover, adhesive detackification or coating techniques can be utilized. One specific example of a low-tack adhesive deemed suitable for many applications is the adhesive used in making Post-it™ repositionable notes which are commercially available from Minnesota Mining and Manufacturing Company of Saint Paul, Minn. Although the use of a low-adhesion portion will not provide complete debonding of one adhesive surface prior to the other of a double-sided stretchable tape construction, it can essentially accomplish that task. The one side will substantially debond and in any case will be easier to remove than the remaining adhesive portion corresponding on the other side of the double-sided stretchable tape construction. At least to some degree, the effects of snap-back and catapulting, discussed above, will be lessened.

Instead of using a less aggressive adhesive composition to define a low-adhesion portion, the surface to which the relevant portion (for early release) of the wheel weight (or bracket) or wheel surface, etc. can be modified to reduce its affinity for the adhesive of one of the adhesion layers of a double-sided stretchable tape. For example, a differential adhesive area on the wheel weight (or bracket) or wheel may be produced through molding or profiling of a textured area which significantly reduces adhesive contact. An advantage of this is that the adhesive layers of the double-sided stretchable tape need not be themselves modified.

Yet another way of accomplishing sequential release can be controlled by positioning of the wheel weight (or bracket) relative to a stretchable double-sided adhesive tape without a differential low-adhesive portion, or a non-adhesive portion (rendered or not). In this regard, reference is made to FIG. 12. A wheel weight/tape article 401 is illustrated which uses tape 400. Tape 400 is similar to the tape of FIG. 1 but with no provision for making a non-adhesive or low-adhesion portion. Tape 400 comprises a stretchable backing 402 and adhesive layers 404 and 406 of the same or different pressure-sensitive adhesive. Stretchable backing 402 can comprise a foam, film or the like, as set out above, or any of the possibilities for laminates and alternate constructions suggested above.

Tape 400 is shown with adhesive layer 404 adhered to the surface of a wheel weight 408, and adhesive layer 406 adhered to wheel surface 410. A tab for stretching is shown as 412.

In order to provide a sequential release, the surface of wheel weight 408 is adhered to adhesive layer 404 but offset inward from a distal end 414 of tape 400. In this way, the surface of wheel weight 408 will completely debond while leaving a portion 416 of the adhesive layer 406 adhered to the surface of wheel 410. Again, stretch removal occurs by applying a force to tab 412 away from the wheel weight 408 and subsequent stretching of the backing 404 and adhesive layers 404 and 406 with substantially simultaneous progressive debonding. When debonding of adhesive layer 404 reaches the upper edge of the surface of wheel weight 408, the wheel weight 408 is completely debonded, while portion 416 remains adhered.

It is also contemplated that for sequential release tapes combinations of non-adhesive portions, release strips, or low-adhesion portions can be used.

In order to protect the tab of the tape one may optionally provide a bracket which is designed to interlock with the wheel weight(s). The bracket should have dimensions such as length, width, and height sufficient to cover the tab. It is preferable that the bracket extends as close to the wheel surface as possible in order to prevent or prevent as much as possible contaminants from reaching the tab. Different interlocking mechanisms are possible. An interlocking mechanism should be selected such that the bracket does not come loose from the wheel weight during the use of an article on the wheel.

When it is time to remove the weight from the wheel one can remove the bracket from its locked position with the weight. The tab of the wheel weight tape article is then exposed. The tab can then be pulled to remove the weight from the wheel.

Figure 15:
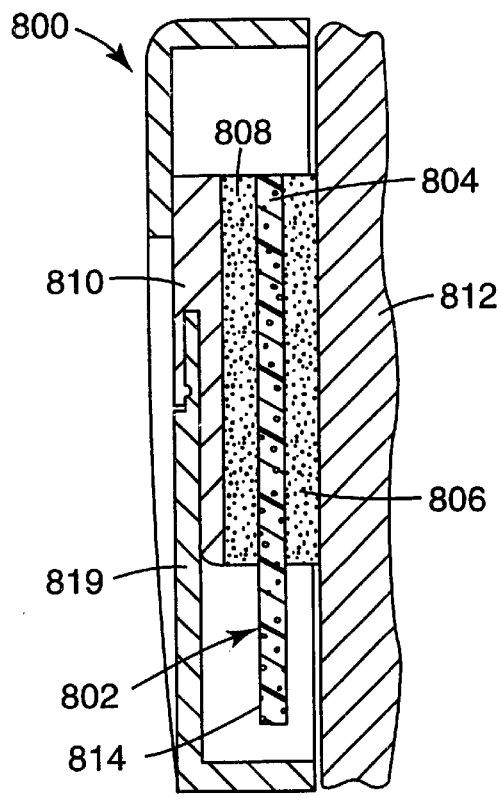
FIG. 15 is an enlarged side view in cross-section of an adhesive tape/weight/bracket article in accordance with the present invention.

FIG. 15 shows such a tape/wheel weight/bracket article 800. The tape 802 comprises backing 804 and adhesive layers 806 and 808. Specifically, adhesive layer 808 is adhered to the back surface of weight 810 and adhesive layer 806 is adhered to the wheel surface 812. Tab 814 extends from under the weight 810 to facilitate stretch removal. Bracket 819 is interlocked with weight 810 and extends over tab 814.

The tab of the tape can also be protected in another manner. The weight may be selected to have dimensions (such as length, width, and height) sufficient to cover the tab. However, such a weight would not be directly attached to the adhesive portion of the tab. Rather a bracket is adhered to the adhesive surface. The bracket does not extend over the tab surface of the tape. Weight(s) however are designed to interlock with the bracket and cover the tab. The weight(s) should fit into the bracket in such a manner and be of sufficient dimensions to prevent or prevent as much as possible exposure of the tab to contaminants.

Figure 16:
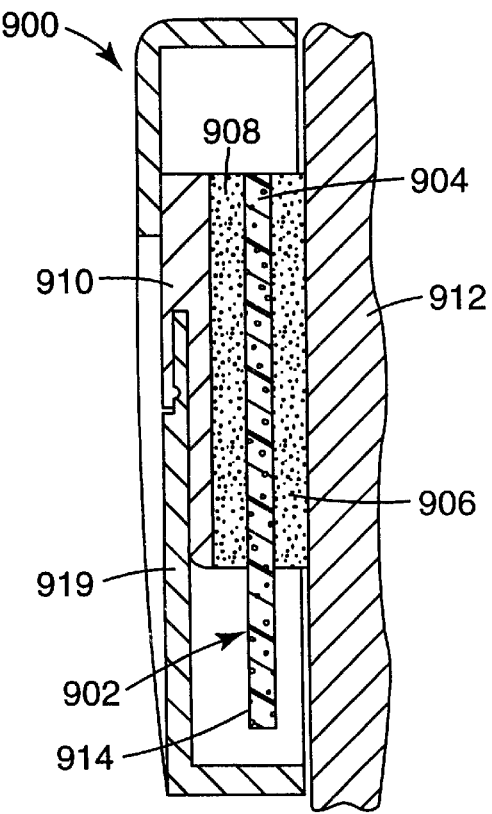
FIG. 16 is an enlarged side view in cross-section of an adhesive tape/bracket/weight article in accordance with the present invention.

FIG. 16 shows such a tape/wheel weight/bracket article 900. The tape 902 comprises backing 904 and adhesive layers 906 and 908. Specifically, adhesive layer 908 is adhered to the back surface of bracket 910 and adhesive layer 906 is adhered to the wheel surface 912. Tab 914 extends from under the weight 910 to facilitate stretch removal. Weight 919 is interlocked with bracket 910 and extends over tab 914.

Any of the previously described tapes used in conjunction with a wheel weight tape articles can be used in conjunction with a wheel weight tape article that also includes a bracket.

Suitable materials for any of the stretchable layers described in any of the embodiments above include, for example, any materials which are stretchable without rupture by at least 50 percent elongation at break and which have sufficient tensile strength so as not to rupture before debonding. Again, such stretchable materials may be either elastically deformable or plastically deformable provided sufficient stretching is possible to cause adhesive debonding of both adhesive surfaces for stretch removal.

Representative examples of materials suitable for either a polymeric foam or solid polymeric film layer in the backing of the tape useful according to this invention of the type utilizing a plastic backing include polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

Polymeric foam layers for use in the plastic backing of the tapes useful according to the invention generally will have a density of about 2 to about 30 pounds per cubic foot (about 32 to about 481 kg/m$^3$), particularly in tape constructions where the foam is to be stretched to effect debonding.

Preferred for plastic polymeric foam layers in the backing of the tapes useful according to the invention are polyolefin foams. Polymeric foam layers are most preferably polyolefin foams available under the trade designations Volextra™ and Volara™ from Voltek, Division of Sekisui America Corporation, Lawrence, Mass.

Elastomeric materials suitable as backings for tapes useful in accordance with the present invention include styrene-butadiene copolymer, polychloroprene (neoprene), nitrile rubber, butyl rubber, polysulfide rubber, cis-i,4-polyisoprene, ethylene-propylene terpolymers (EPDM rubber), silicone rubber, polyurethane rubber, polyisobutylene, natural rubber, acrylate rubber, thermoplastic rubbers such as styrene butadiene block copolymer and styrene-isoprene-styrene block copolymer and TPO rubber materials.

Solid polymeric film backings are preferably selected from polyethylene and polypropylene films, with the most preferred materials being unoriented linear low density and ultra low density polyethylene films. A preferred polyethylene film is that available under the trade designation XMAX™ 161 from Consolidated Thermoplastics Company, Schaumburg, Ill.

The backing may vary in overall thickness so long as it possesses sufficient integrity to be processable and handleable and provides the desired performance in respect to stretching properties for debonding the backing or tape from the wheel weight (or bracket) and wheel surface. The specific overall thickness selected for a backing will depend upon the physical properties of the polymeric foam layer or layers and any solid polymeric film layer forming the backing. Where only one polymeric film or foam layer of a multi-layer backing is intended to be stretched to effect debonding, that layer should exhibit sufficient physical properties and be of a sufficient thickness to achieve that objective.

A plastic polymeric film layer such as is contained in the constructions of FIGS. 9 and 10 preferably will be about 0.4 to 10 mils in thickness, and will most preferably be about 0.4 to 6 mils in thickness.

The adhesive of the adhesive layers, excluding. adhesives usable for the low-adhesion portion of a differential release tape, can comprise any pressure-sensitive adhesive, with the particular adhesion properties being dependent on the use of the tape, with the preferred adhesion properties generally ranging from about 4 N/dm to about 200 N/dm, preferably from about 25 N/dm to about 100 N/dm, at a peel angle of 180°, measured according to PSTC-1 and PSTC-3 and ASTM D 903-93 at a peel rate of 12.7 cm/min. Adhesives having higher peel adhesion levels usually require backings having higher tensile strength.

Adequate testing should be conducted to verify that the adhesive and tape construction and placement is sufficient to withstand weather conditions, wheel rotations, road conditions and safety requirements.

Pressure-sensitive adhesives which may be suitable for application to the sides of the backing include tackified rubber adhesives, such as natural rubber; olefins; silicones; synthetic rubber adhesives such as polyisoprene, polybutadiene, and styrene-isoprene-styrene, styrene-ethylene-butylene-styrene and styrene-butadiene-styrene-block copolymers, and other synthetic elastomers, and tackified or untackified acrylic adhesives such as copolymers of isooctylacrylate and acrylic acid, which can be polymerized by radiation, solution, suspension, or emulsion techniques. Preferred are synthetic rubber adhesives or acrylics.

The thickness of each adhesive layer (for tapes having a backing) can range from about 0.6 mils to about 40 mils (about 0.015 mm to about 1.0 mm), preferably from about 1 mils to about 16 mils (about 0.025 mm to about 0.41 mm). In this preferred range of thicknesses, the thicker layers tend to cause the tapes to be more easily removable than do thinner layers. This is in contrast to conventional methods of removal, such as removal by peeling at peel angles of 90° or higher. In general, thicker layers of adhesive tend to cause the tapes to exhibit higher peel strength at a peel angle of 180° than do thinner layers. When the tapes used according to the present invention are released by stretching at a low angle, i.e., under 35°, the adhesive tends to be constrained by the backing and the wheel weight (or bracket) and wheel surface for a double-coated adhesive tape, and is forced to undergo significant elongation. Under these conditions, each adhesive layer contracts, which reduces its cross-sectional area. Since the cross-sectional area, i.e., thickness times width, of a thinner layer of adhesive is already less than that of a thicker layer of adhesive, stress, i.e., force per unit area, is greater in the thinner layer of adhesive than in the thicker layer of adhesive. This leads, in effect, to a stiffening of the adhesive. Because stiffer layers offer more resistance to deformation, the force required for debonding is greater. The exposed adhesive layers may be laminated to a conventional release liner prior to use.

The thickness ranges for solid adhesives would typically be about 5 to 120 mils (about 0.13 mm to about 3 mm), preferably about 20 to 60 mils (about 0.5 to about 1.6 mm).

Adhesives for adhering one polymeric foam layer to either another polymeric foam layer or a solid polymeric film layer include those pressure-sensitive adhesive compositions described above. Preferably the adhesive layer for adjoining one polymeric layer of the backing to another will be about 1 to 10 mils (about 0.025 to 0.25 mm) in thickness. Other methods of adhering the polymeric layers of the backing to one another include such conventional methods as co-extrusion or heat welding.

The tape used according to the present invention having a backing can be produced by any conventional method for preparing pressure-sensitive adhesive tapes. For example, the adhesive can either be directly coated onto the backing, or it can be formed as a separate layer and then later laminated to the backing.

Removing the tape from the surface of a substrate can be carried out by simply stretching the tape in a direction up to an angle of about 35° from the surface. Preferably, the tape can be removed from the surface of a substrate by stretching the tape at an angle of no greater than about 10°. Removal at the appropriate angle will result in leaving no substantial or appreciable adhesive residue and in preventing the surface of the substrate from being damaged.

Debonding of a highly elongated adhesive tape of this invention at low angles is characterized by a "sharp" type of crack propagation. Like fracture of glassy materials, a sharp crack leads to high stress concentration at the crack front, where there is a low volume of adhesive material (in which stress may be dissipated). High stress concentration at the crack front leads to what is called brittle cleavage failure of the adhesive. Such failure typically occurs with low force (because of the low amount of energy dissipated in the adhesive material) and is cleanly interfacial.

In contrast, for higher peeling angles, i.e., angles generally greater than 35°, the backing tends not to stretch and the adhesive tends to undergo filamentation and rupture cohesively. Like fracture of glassy materials, propagation of a "blunt" crack is preceded by crazing. In this model, the observed filamentation of the adhesive at higher angles serves principally as an energy dissipation mechanism, analogous to craze fibrils found in glassy materials. The greater the energy dissipation, the greater the resistance to peeling and the higher the force required to peel the tape. A larger volume of material is involved in energy dissipation, and, as stated previously, stress is less concentrated. The adhesive filaments rupture cohesively to leave residue of adhesive on the wheel surface and wheel weight surface or to cause damage to the surface.

Wheel Weights/Brackets/Wheels

A variety of wheel weights can be used according to the present invention. The wheel weight typically is symmetrical in shape and typically has at least one flat surface or curved surface that allows ready attachment to the wheel surface. The wheel weight typically comprises metal. The wheel weight most typically comprises a high density material such as lead. Typically most wheel weights are of a three dimensional rectangular shape and typically vary in weight from about ¼ ounce to about 3 ounces (about 7 to about 85 grams).

A variety of brackets can be used according to the present invention. The bracket typically is symmetrical in shape and typically has at least one flat surface or curved surface that allows ready attachment to the wheel surface (when the bracket is to be attached directly to the tape). The bracket typically comprises metal. When a wheel weight and bracket are used together each may independently have grooves, protrusions, notches, and/or other features that facilitates the locking of the weight to the bracket.

Wheels to which the articles of the invention may be applied may comprise for example steel, aluminum, aluminum/magnesium or other alloy blends. The articles of the invention can be applied to different areas of the wheel. It is believed that the articles of the invention would be useful on wheels on a variety of vehicles, such as cars, trucks, vans, motorcycles, etc.

The weights used according to the invention are available commercially. Typically either one weight or a multiple weight section is applied to the adhesive tape. It may be possible to attach more than one separate weight section to a single tape.

Applying Article to Wheel

One should exercise care in providing an article of the invention and ensure that the article undergoes adequate testing before use to determine if the article will remain adhered under the speed, weather, wheel substrate, potential contamination conditions which the article may be subjected to.

It is most advantageous that the article of the invention he applied to a surface of a wheel that is both clean and dry.

Figure 13:
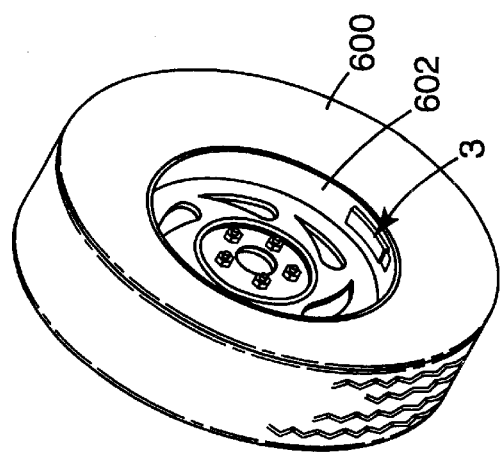
FIG. 13 is a perspective view of the article of FIG. 1*a* attached to a wheel.

Referring to FIG. 13 the article 3 of FIG. 1a is adhered to weight 5 via pressure sensitive adhesive layer 16 and to wheel 602 via pressure sensitive adhesive layer 14. A portion 26 of the backing 12 extends beyond the weight 5 and adhesive layers 14 and 16. This backing extension in effect forms a tab 26 which can be pulled when removal of the weight 5 from the wheel 602 is desired. The tire is identified as 600.

The particular construction of the tape, e.g., the type of backing (if present), the type of adhesive composition(s), and relative position of backing (if present) and adhesive layers, may differ depending on the size of the wheel weight (and bracket if present), the weather conditions it may be subject to, the contaminants it may be subject to, the type of vehicle the article may be attached to, etc.

Figure 14:
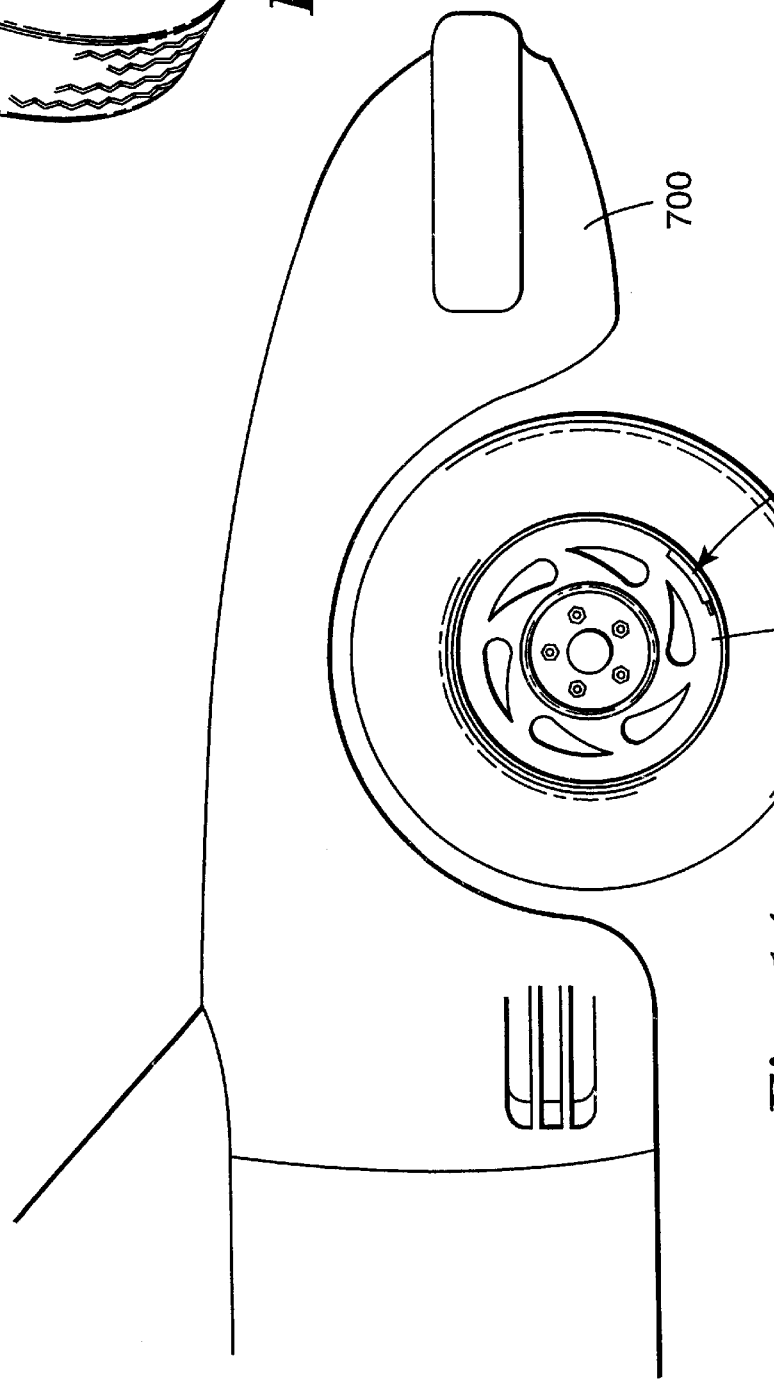
FIG. 14 is a side view of the article of FIG. 1*a* attached to the wheel of an automobile.

FIG. 14 shows article 3 of FIG. 1a of the present invention 58 attached to the wheel 706 of a vehicle 700. The tire is identified as 702. Wheel weights bonded by means of conventional adhesive tapes can not be removed without scraping or otherwise damaging the surface of the wheel. By using articles of the present invention for mounting wheel weights, such wheel weights can be held securely in place during use and can be removed when desired without damaging the surface of the wheel or leaving unsightly residue.

The adhesive layer 16 opposite the wheel weight 5 is capable of firmly bonding to the wheel surface 706 which is typically metal. In order to use the wheel weight/tape article 3 typically a protective liner 18 is peeled to expose the layer of adhesive 14 on the side of the backing 12 opposite the wheel weight 5. The wheel weight/tape article 3 is then pressed on the wheel 706 in the desired location. In order to remove the wheel weight/tape article 3, the tab can be pulled in a direction parallel to the wheel 706. As the tape stretches, it slowly releases the wheel weight 5 from the wheel 706. Each article can be designed to hold weights, even in excess of 15 pounds per lineal inch yet can be removed without leaving any residue on the surface of the wheel. The article of the invention should have its components selected such that the article can withstand the centrifugal forces or rotational forces and weather and other environmental conditions it may be subjected to.

The wheel weight mounting systems currently in use employ aggressive pressure-sensitive adhesives that give long adhesion durability; however, they are difficult to remove from the surface of a substrate. Methods for adhesive removal currently in use employ heat (from a heat gun, heat lamp, or hot water) or organic solvents or both and/or scraping with a tool. Removal by heat may still leave deposits of adhesive on the substrate which must be removed with organic solvents. Solvents and peeling action may damage the surface by removing paint or other finishes. Solvents require precautions for proper ventilation, fire prevention, storage, and disposal. Some of these methods require temperatures above a minimum temperature or within a specified temperature range. Furthermore scraping can result in scratching of the wheel.

The article used according to the present invention allows the use of aggressive adhesives, but provides a much simpler and easier means of removal. The wheel weight or bracket can be removed from a wheel by stretching the extensible layer substantially in the plane of the wheel. This manner of removal is clean and dry, thereby avoiding environmental health, storage, and disposal problems associated with organic solvents. In addition, the tapes tend to leave no adhesive residue on the substrate or damage the substrate, e.g., remove paint and/or other coatings. These characteristics provide savings of both cost and time to the user. Upon removal of the tape, the damage to the wheel will be minimal or nonexistent, (typically nonexistent), and little or no (typically no) residual adhesive will remain thereon.

Many tapes that provide adequate adhesion for wheel weights are not easily removable and leave behind adhesive residue on the wheel surface. Tapes that are too easily removable do not provide adequate adhesion and can detach during use, and render the wheel unbalanced. The tape used according to the present invention can be removed by pulling it at an angle of less than 35 degrees from the surface of the wheel to which it is adhered. Useful tapes according to the present invention have high adhesion and can be held firmly in place during use, yet they can be easily removed without leaving adhesive residue or damaging the surfaces to which they are bonded. The tape can be removed from the wheel and the wheel weight (or bracket) by pulling it in a direction substantially tangential to the wheel surface to which it is bonded. The tab provides a means of which the tape may be easily grasped for removal.

Test Methods for Testing Wheel Weight/Tape Articles of the Invention

Adhesive Residue

The amount of adhesive residue remaining on the wheel or other test surface was determined by visual inspection.

Surface Damage

The occurrence of any damage to the surface of the wheel or other test surface was determined by visual inspection.

Tape Properties

In determining whether the cohesive strength of the tape is greater than its adhesive strength one can select a standard wheel weight such as a ¼ ounce (7 grams) lead weight and select a standard type vehicle wheel such as a powder coated or clear coated alloy automobile (such as the wheel disclosed in Example 3) which is clean and dry in making the determination. The wheel weight would be applied to one side of the tape and the other side of the tape would be attached to the clean and dry wheel. The tape would then be removed by gripping the tab in a manner to stretch the tape at an angle no greater than 35° from the surface of the wheel. If the cohesive strength of the tape is greater than its adhesive strength to the wheel and wheel weight the tape should release from both the wheel and the wheel weight in a manner in which the tape does not split apart or otherwise separate.

EXAMPLES

The following non-limiting examples will further illustrate the articles of the invention and their use.

Example 1

The wheel weights used according to this example were acquired by first obtaining a conventional tape/wheel weight attachment system and removing a four weight section therefrom. The conventional attachment system was a two-sided adhesive coated foam tape having lead weights attached thereto which was purchased from Tires Plus in Oakdale, Minn., USA. The tape was of a type which would leave adhesive residue upon removal. The tape had 8–10 individual ¼ oz. (7 grams) weights attached to one side thereof The weights were joined to each other but, were designed such that sections of one or more weights could easily be broken off. The tape also had a release liner on the side opposite the weights.

The double sided foam tape was removed from the four weight section. Each of the four wheel weights joined together had a substantially rectangular shape. A poster strip with Command™ adhesive available from Minnesota Mining and Manufacturing Company ("3M Company") was then applied to the four weight section. The tape comprised a foam backing with adhesive coated on either side thereof The foam backing of the poster strip was approximately 42 mils thick, 1.813" (4.605 cm) long and 0.625" (1.588 cm) wide. At one end of the foam backing a section of the tape was free of adhesive on both sides. This provided a tab which could be pulled for removal of the tape. The tape was cut away (except for the tab) where it extended beyond the wheel weights. The wheel weight/tape article prepared from the poster strip and the four weight section was adhered to a (10.16 cm×30.48 cm) painted test panel available from ACT. The weight/tape article was allowed to "set" for 1 hour. To demonstrate the effectiveness of the wheel weight/tape article, the tab was pulled straight against the ACT panel (at an angle less than 35°) according to the Command™ adhesive strip directions for the strips. The tape pulled cleanly away from both the wheel weight and the painted panel to which it was applied leaving no adhesive residue behind. No surface damage of the test panel was observed.

Example 2

The same procedure was followed as in Example 1 except that the wheel weight/tape article was applied to a powder coated (a painting technique) metal file cabinet rather than a painted ACT test panel. This powder coated metal surface was used to determine the release on a metal substrate having a different type of paint coating thereon. This surface was used to simulate a wheel surface. The tape was removed from the file cabinet according to the poster strip directions by pulling straight against the file cabinet (at an angle less than 35°). The tape pulled cleanly away from both the wheel weight and the file cabinet to which it was applied, leaving no adhesive residue behind. No surface damage of the file cabinet was observed.

Example 3

The same procedure was followed as in Example 1 except that the wheel weight/tape article was applied to a wheel. The wheel which was a magnesium aluminum powder coated wheel. The wheel was placed onto a work bench. The wheel was cleaned using a paper towel and 3M General Purpose Adhesive Cleaner part #8984 to remove all brake dust, oil, dirt, etc. The wheel was then washed with 3M Car Wash Soap and allowed to dry.

The wheel weight/tape article was applied to the outside wheel; rim with thumb pressure. It was allowed to "set" for 1 hour. After one hour, the tab was pulled straight against the wheel (at an angle of less than 35°) from the surface of the wheel per the Command™ adhesive directions. The tape pulled cleanly away from both the wheel weight and the wheel to which it was applied, leaving no adhesive residue behind. No surface damage of the wheel was observed.

Example 4

A tape construction is prepared using an elastic solid adhesive product available from Beiersdorf AG of Hamburg, Germany commercially available as Tesa Power Strips™. A release strip of ¼ inch (0.635 cm) length and tape width is prepared from a portion of the release liner provided on the tape product and is applied to one end of the tape product away from a tab provided on the tape product. The modified tape product is applied to a wheel weight and wheel surface once with the release strip against the wheel weight surface and a different time with the release strip against the wheel surface.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An article comprising:
    (a) a stretchable tape, wherein the tape has a first major surface and a second opposing major surface; and
    (b) a weight bonded to the first major surface of the tape;
        wherein said tape is capable of being firmly bonded to a wheel via the second major surface of the tape and further being capable of being removed from the wheel and the weight after being stretched at an angle no greater than about 35 degrees from the surface of the wheel, wherein a tab extends from the tape from at least one end, wherein said tab is capable of being gripped in a manner to stretch the tape at an angle no greater than 35° from the surface of the wheel,
    wherein the cohesive strength of the tape is greater than its adhesive strength to the weight and the wheel.

2. The article of claim 1 wherein the tape comprises a backing, wherein the backing has a first major surface and a second opposing major surface, wherein the backing bears on each of the first and second major surfaces a layer of pressure-sensitive adhesive.

3. The article of claim 2 wherein the backing is selected from the group consisting of plastic and elastic backings.

4. The article of claim 2 wherein the backing is a stretchable material which is a laminate comprising at least one layer of polymeric foam and at least one layer of polymeric film.

5. The tape of claim 2 wherein the backing is a stretchable material selected from the group consisting of polymeric film, polymeric foam, polymeric film laminated to polymeric foam, and two polymeric films laminated to opposite sides of a layer of polymeric foam.

6. The article of claim 1 wherein the tape is a single layer of a solid adhesive.

7. The article of claim 1 wherein the tape is a controlled sequential release tape.

8. The article of claim 1 wherein the weight is a metal weight of about 7 to about 85 grams.

9. The article of claim 1 wherein the weight comprises lead.

10. An assembly comprising: a wheel having the article of claim 1 bonded thereto via the second major surface of the article.

11. An assembly comprising: a vehicle having the article of claim 1 bonded to a wheel of the vehicle via the second major surface of the article.

12. An article comprising:
    (a) a stretchable tape, wherein the tape has a first major surface and a second opposing major surface; and
    (b) a bracket bonded to the first major surface of the tape; and (c) a weight interlocked into the bracket, wherein the weight is not directly bonded to the tape;

wherein said tape is capable of being firmly bonded to a wheel via the second major surface of the tape and further being capable of being removed from the bracket after being stretched at an angle no greater than about 35 degrees from the surface of the wheel, wherein a tab extends from the tape from at least one end, wherein the weight extends over the tab, wherein the weight is capable of being subsequently removed from the bracket to expose the tab, wherein said tab is capable upon removal of the weight of being gripped in a manner to stretch the tape at an angle no greater than 35° from the surface of the wheel, wherein the cohesive strength of the tape is greater than its adhesive strength to the bracket and the wheel.

13. The article of claim 12 wherein the tape comprises a backing, wherein the backing has a first major surface and a second opposing major surface, wherein the backing bears on each of the first and second major surfaces a layer of pressure-sensitive adhesive.

14. The article of claim 13 wherein the backing is selected from the group consisting of plastic and elastic backings.

15. The article of claim 13 wherein the backing is a stretchable material which is a laminate comprising at least one layer of polymeric foam and at least one layer of polymeric film.

16. The tape of claim 13 wherein the backing is a stretchable material selected from the group consisting of polymeric film, polymeric foam, polymeric film laminated to polymeric foam, and two polymeric films laminated to opposite sides of a layer of polymeric foam.

17. The article of claim 12 wherein the tape is a single layer of a solid adhesive.

18. The article of claim 12 wherein the tape is a controlled sequential release tape.

19. The article of claim 12 wherein the weight is a metal weight of about 7 to about 85 grams.

20. The article of claim 12 wherein the weight comprises lead.

21. An assembly comprising: a wheel having the article of claim 12 bonded thereto via the second major surface of the article.

22. An assembly comprising: a vehicle having the article of claim 12 bonded to a wheel of the vehicle via the second major surface of the article.

23. An article comprising:
(a) a stretchable tape, wherein the tape has a first major surface and a second opposing major surface; and
(b) a weight bonded to the first major surface of the tape; and
(c) a bracket interlocked into the weight, wherein the bracket is not directly bonded to the tape;

wherein said tape is capable of being firmly bonded to a wheel via the second major surface of the tape and further being capable of being removed from the wheel and the weight after being stretched at an angle no greater than about 35 degrees from the surface of the wheel, wherein a tab extends from the tape from at least one end, wherein the bracket extends over the tab, wherein the bracket is capable of being subsequently removed from the weight to expose the tab, wherein said tab is capable upon removal of the bracket of being gripped in a manner to stretch the tape at an angle no greater than 35° from the surface of the wheel, wherein the cohesive strength of the tape is greater than its adhesive strength to the weight and the wheel.

24. The article of claim 23 wherein the tape comprises a backing, wherein the backing has a first major surface and a second opposing major surface, wherein the backing bears on each of the first and second major surfaces a layer of pressure-sensitive adhesive.

25. The article of claim 24 wherein the backing is selected from the group consisting of plastic and elastic backings.

26. The article of claim 24 wherein the backing is a stretchable material which is a laminate comprising at least one layer of polymeric foam and at least one layer of polymeric film.

27. The tape of claim 24 wherein the backing is a stretchable material selected from the group consisting of polymeric film, polymeric foam, polymeric film laminated to polymeric foam, and two polymeric films laminated to opposite sides of a layer of polymeric foam.

28. The article of claim 23 wherein the tape is a single layer of a solid adhesive.

29. The article of claim 23 wherein the tape is a controlled sequential release tape.

30. The article of claim 23 wherein the weight is a metal weight of about 7 to about 85 grams.

31. The article of claim 23 wherein the weight comprises lead.

32. An assembly comprising: a wheel having the article of claim 23 bonded thereto via the second major surface of the article.

33. An assembly comprising: a vehicle having the article of claim 23 bonded to a wheel of the vehicle via the second major surface of the article.

34. A method comprising the steps of:
(a) providing an article comprising
(i) a stretchable tape, wherein the tape has a first major surface and a second opposing major surface; and
(ii) a weight bonded to the first major surface of the tape;

wherein said tape is capable of being firmly bonded to a wheel via the second major surface of the tape and further being capable of being removed from the wheel and the weight after being stretched at an angle no greater than about 35 degrees from the surface of the wheel, wherein a tab extends from the tape from at least one end, wherein said tab is capable of being gripped in a manner to stretch the tape at an angle no greater than 35° from the surface of the wheel, wherein the cohesive strength of the tape is greater than its adhesive strength to the weight and the wheel; and (b) applying the article to a wheel via the adhesive on the second major surface of the article.

35. The method of claim 34 which farther comprises the step (c) of subsequently removing the tape from the wheel and the weight by grasping the tab and stretching the tape at an angle no greater than about 35° from the surface of the wheel in order to remove the tape from the wheel and the weight, wherein no or substantially no pressure sensitive adhesive from the article remains on the wheel.

36. The method of claim 34 which further comprises the step (c) of subsequently removing the tape from the wheel and the weight by grasping the tab and stretching the tape at an angle no greater than about 35° from the surface of the wheel in order to remove the tape from the wheel and the weight, wherein no pressure sensitive adhesive from the article remains on the wheel.

37. A method comprising the steps of
(a) providing a tape comprising
  (i) a stretchable tape, wherein the tape has a first major surface and a second opposing major surface; and
  (ii) a bracket bonded to the first major surface of the tape; and
  (iii) a weight interlocked into the bracket, wherein the weight is not directly bonded to the tape;
    wherein said tape is capable of being firmly bonded to a wheel via the second major surface of the tape and further being capable of being removed from the bracket after being stretched at an angle no greater than about 35 degrees from the surface of the wheel, wherein a tab extends from the tape from at least one end, wherein the weight extends over the tab, wherein the weight is capable of being subsequently removed from the bracket to expose the tab, wherein said tab is capable upon removal of the weight of being gripped in a manner to stretch the tape at an angle no greater than 35° from the surface of the wheel,
  wherein the cohesive strength of the tape is greater than its adhesive strength to the bracket and the wheel; and
(b) applying the article to a wheel via the adhesive on the second major surface of the article.

38. The method of claim 37 which further comprises the step (c) of subsequently removing the tape from the wheel and the bracket by grasping the tab and stretching the tape at an angle no greater than about 35° from the surface of the wheel in order to remove the tape from the wheel and the bracket, wherein no or substantially no pressure sensitive adhesive from the article remains on the wheel.

39. The method of claim 37 which further comprises the step (c) of subsequently removing the tape from the wheel and the bracket by grasping the tab and stretching the tape at an angle no greater than about 35° from the surface of the wheel in order to remove the tape from the wheel and the bracket, wherein no pressure sensitive adhesive from the article remains on the wheel.

40. A method comprising the steps of:
(a) providing a tape comprising
  (i) a stretchable tape, wherein the tape has a first major surface and a second opposing major surface; and
  (ii) a weight bonded to the first major surface of the tape; and
  (iii) a bracket interlocked into the weight, wherein the bracket is not directly bonded to the tape;
    wherein said tape is capable of being firmly bonded to a wheel via the second major surface of the tape and further being capable of being removed from the wheel and the weight after being stretched at an angle no greater than about 35 degrees from the surface of the wheel, wherein a tab extends from the tape from at least one end, wherein the bracket extends over the tab, wherein the bracket is capable of being subsequently removed from the weight to expose the tab, wherein said tab is capable upon removal of the bracket of being gripped in a manner to stretch the tape at an angle no greater than 35° from the surface of the wheel, wherein the cohesive strength of the tape is greater than its adhesive strength to the weight and the wheel; and
(b) applying the article to a wheel via the adhesive on the second major surface of the article.

41. The method of claim 40 which further comprises the step (c) of subsequently removing the tape from the wheel and the weight by grasping the tab and stretching the tape at an angle no greater than about 35° from the surface of the wheel in order to remove the tape from the wheel and the weight, wherein no or substantially no pressure sensitive adhesive from the article remains on the wheel.

42. The method of claim 40 which further comprises the step (c) of subsequently removing the tape from the wheel and the weight by grasping the tab and stretching the tape at an angle no greater than about 35° from the surface of the wheel in order to remove the tape from the wheel and the weight, wherein no pressure sensitive adhesive from the article remains on the wheel.

* * * * *

UNITED STATES PATENT AND TRADEMARK OFFICE
CERTIFICATE OF CORRECTION

PATENT NO.   : 6,413,626 B1
DATED        : July 2, 2002
INVENTOR(S)  : Wollner, Mark R.

It is certified that error appears in the above-identified patent and that said Letters Patent is hereby corrected as shown below:

<u>Column 1,</u>
Line 27, insert -- . -- following "thereon".

<u>Column 6,</u>
Line 59, delete "Taps" and insert in place thereof -- Tapes --.

<u>Column 18,</u>
Line 67, delete "903-93" and insert in place thereof -- 903-83 --.

<u>Column 23,</u>
Lines 3 and 13, insert -- . -- following "thereof".

Signed and Sealed this

First Day of June, 2004

JON W. DUDAS
*Acting Director of the United States Patent and Trademark Office*